United States Patent Office 3,845,182
Patented Oct. 29, 1974

3,845,182
METHOD AND APPARATUS FOR PRODUCING UNSUPPORTED FOAMED RESINOUS SURFACE COVERINGS
John Biskup, Chatham, Robert K. Petry, Morris Plains, and Robert E. J. Murphy, Nutley, N.J., assignors to Congoleum Industries, Inc., Kearny, N.J.
Filed Aug. 30, 1971, Ser. No. 176,154
Int. Cl. B29c 1/04; B29d 27/04
U.S. Cl. 264—45.1                                      14 Claims

ABSTRACT OF THE DISCLOSURE

A method and apparatus for producing unsupported resinous surface coverings and the like including provision of a moisture pervious support web, applying a release coat to the support web, forming a resinous layer including a wear layer on the release coat, impregnating the support web with moisture, and subsequently stripping the resinous layer from the support web.

---

This invention relates to a method and apparatus for producing unsupported resinous surface coverings and the like and relates more particularly to a method and apparatus for forming a resinous surface covering on a support web, and then stripping the resinous layer from the support web.

In recent years, resinous surface coverings such as vinyl surface coverings for floors, walls, ceilings, and the like have become exceedingly popular. In general, vinyl or other resinous surface coverings are made with either a felt backing layer, or a similar non-felt backing layer. Such felt backing layers are commonly either cellulosic or asbestos fiber felts, and the resinous layer is then formed on the felt. Frequently, a foam interlayer is provided, and a wear layer is applied over the foam layer to provide a resilient effect.

In the formation of unsupported surface coverings such as vinyl sheets and the like utilizing coating apparatus, it is first necessary to form the resinous composition in a layer on a suitable carrier web, and subsequently strip the resinous layer from the support web, and cut the vinyl layer to the proper size.

The support webs utilized in the manufacture of unsupported vinyl sheets and the like are usually a release paper, i.e., a thin paper which is treated with a release coating agent to assist in stripping the vinyl product from the carrier web and generally of a non-porous cellulosic composition having a relatively hard surface.

However, such carrier webs are only available in widths of 80 inches, but these sheets have heretofor created problems because of the difficulties encountered with stripping. The larger available sheets are more porous and/or have felt characteristics causing tearing, spot delamination and destruction of the support web during stripping.

Therefore, it is a primary object of this invention to provide a method and apparatus for producing large widths of unsupported resinous surface coverings.

Another object of this invention is to produce an unsupported resinous surface covering using an available inexpensive porous and/or felt web as a support which can be easily stripped without destruction of the support web or such related problems.

Still another object of this invention is to provide a process for producing wide width surface coverings which costwise are economically competitive with the production of regular or narrow width surface coverings.

Another object of this invention is to provide an improved method for producing unsupported resinous surface coverings wherein the resinous layer is formed on a carrier web and is subsequently stripped therefrom.

Still another object of this invention is to provide a method for producing vinyl surface coverings on a carrier web wherein static discharge is substantially reduced or eliminated at the stripping point.

Still a further object of this invention is to provide a method for producing resinous surface coverings on a release coat-treated carrier web wherein the stripability of the product from the carrier web is substantially improved for large width sheets.

Yet another object of this invention is to provide an inexpensive method of producing resinous surface coverings by permitting the support web to be reused.

These and other objects and advantages of this invention will become apparent when considered in light of the following description and claims when taken together with the drawings in which:

Figure 1:
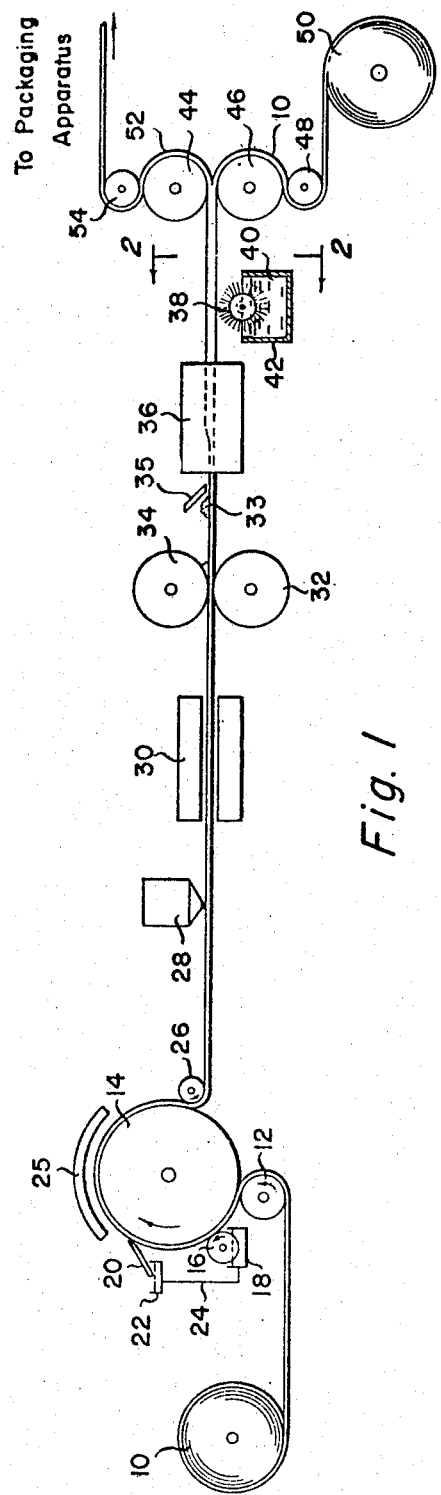
FIG. 1 is a schematic illustration of the apparatus of this invention.

With reference to FIG. 1 of the drawings, a suitable supply of a felt carrier web, such as roll 10, is shown. The felt used in this invention should be a moisture pervious or absorptive felt which is preferably of cellulosic fibers. Although it may be possible to use asbestos webs, asbestos felt does not absorb water as well as the cellulosic fibers. The felt usually has a thickness of 0.018–0.065 inch, however, a preferred thickness is 0.038 inch. The felt 10 extends over an idler roll 12 and around the large roll 14. Contacting the felt 10 while it is on the roll 14 is a coating roll 16 which is partially submersed in a reservoir 18 which contains a suitable release coat as will be described later. The roll 16 applies a coating of the release coat to the upper surface of web 10. A doctor knife 20 is provided for smoothing the coating of a release agent on the web, and any coating which is removed by the doctor 20 flows into a reservoir 22 from which it may flow by line 24 back into reservoir 18. After the release coating agent is applied to the web 10, the web 10 passes under a heater 25, such as a bank of infra-red heat lamps, for drying the coating and then around a second idler roll 26. Although the coating roll 16 is shown in the drawings, it is to be understood that any suitable coating applicator could be used for applying the release coating to the web. Other types of coating applicators could be a curtain coater, spray coater, printing applicator and the like.

The web 10 now continues to the right as seen in FIG. 1 where a suitable coating applicator 28 is provided. Applicator 28 may be the same as that utilized for applying the release coat or any other suitable type of applicator may be provided in this position. Applicator 28 applies a layer of a resinous plastisol such as a vinyl plastisol over the release coating.

Next the web 10 passes through an oven 30 or other suitable heating means which serves to heat the plastisol until it attains a gel state. Next, a vinyl or other suitable wear layer resin is printed or otherwise applied over the gelled plastisol. In the drawing, a rotogravure printing press having a rubber backing roll 32 and an engraved printing roll 34 is utilized for printing a decoration on the surface of the gelled plastisol. The printed gelled sheet is then passed to a coating operation, such as a doctor blade 35, which applies a thin layer of wear layer composition.

Next, a second oven or other heating means 36 is provided. Oven 36 serves to foam the plastisol and fuse the wear layer composition in the same operation. As the felt web 10, having the foamed layer and the wear layer thereon, emerges from the oven 36, moisture is applied to the bottom of the felt web 10 so as to raise the moisture content of the web 10. In the drawings, a brush 38 is shown dipping into water 40 contained within a reservoir 42.

Although the rotating brush 38 has been found to provide good moisturizing ability, a water spray or other types of moisturizing apparatus could be utilized at this position instead of the brush 38. Finally, the web 10 having the resinous product formed thereon is passed through the nip formed by a pair of rolls 44 and 46. At this point, the felt carrier web 10 passes in a clockwise direction downwardly around roll 46, and back around an idler roll 48 after which it is rewound on a roll 50. The resinous product 52 which has been stripped from the web 10 passes in a counter clockwise direction upwardly around roll 44 and then around an idler roll 54. The product 52 then proceeds to suitable cutting and packaging apparatus well known in the art.

The oven 30 is maintained at a temperature which is just sufficient to gel the plastisol during its residence time in the oven 30 without foaming the plastisol at this stage. The temperature may vary to some extent with the type of plastisol used, however, 300–330° F. has been found to be a suitable range. Oven 36 should be at a higher temperature for at least a portion of the travel of the web therethrough. For example, if a multi-zone oven is utilized, at least one zone should be at a temperature higher than that of oven 30 and preferably around 400° F., so as to foam the plastisol and fuse the wear layer.

The particular release coating agent utilized in reservoir 18 is preferably a hydroxy ethyl cellulose release coating. However, other hydroxy alkyl cellulose compounds may be used such as hydroxy-methyl-propyl cellulose. Other suitable parting agents which are useful in the release coat are silicones, starches, polyvinyl alcohol, polymerized micro-crystalline waxes, and fluorocarbon polymers such as Teflon. A typical coat which has been found to be quite suitable in the practice of this invention is set forth in Table 1.

TABLE 1

| | Percent |
|---|---|
| High viscosity hydroxy ethyl cellulose [1] | 0.41 |
| Low viscosity hydroxy ethyl cellulose [2] | 5.9 |
| Ammonium hydroxide | 0.17 |
| Mildew preventive [3] | 0.20 |
| Wetting agent [4] | 0.20 |
| High molecular weight copolymer polyvinyl acetate emulsion of 51–53% solids and 0.7 microns average particle size [5] | 4.16 |
| Aqueous dispersion of acrylic copolymer [6] | 0.98 |
| Defoaming agent [7] | 0.29 |
| Water | Balance to 100 |

[1] Union Carbide High Viscosity Hydroxy Ethyl Cellulose WO-440H.
[2] Union Carbide Low Viscosity Hydroxy Ethyl Cellulose WP-09H.
[3] Dow Chemical Mildew Preventive Dowicide A.
[4] Victor Chemical Division of Stouffer Chemical Co. Wetting Agent Victor Wet 12.
[5] Air Reduction Company Vinyl Acrylic Latex, Flexbond 800.
[6] Rohm and Haas Crosslinking Acrylic Latex, Rhoplex E32.
[7] Ultra-Adhesive Company Defoamer, Deefo 278.

The release coating may be applied at a thickness of about 0.004–0.010 inch, however, preferably the coating would have a thickness of 0.0055 inch when wet. The dry thickness is usually less than 0.001 inch. This amounts to approximately 0.16–0.47 pounds of release coating per square yard when wet, and preferably 0.24 pounds per square yard. After the web has passed through ovens 30 and 36, the release coating is dried and amounts to about 0.017–0.048 pounds per square yard dry, and preferably about 0.025 pounds per square yard.

After the cellulosic felt has passed through ovens 30 and 36, and before the moisture is applied thereto, the felt has a moisture content of about 1–2%. The moisturizing brush 38 or other apparatus is utilized to raise the moisture content of the felt to within the range of about 4% to 10%, with about 6% being particularly effective. Higher quantities can be used, if desired, depending on such factors as the wet strength of the felt. If too much moisture is added to the web, the result will be blushing in the final wear layer which requires drying of the felt to remove. If too little moisture is applied, the felt will be torn as the resin layer is stripped therefrom.

An additional important feature of the present invention is that static electricity, which would ordinarily be present in prior art stripping apparatus is eliminated by the presence of the moisture within the felt. This static charge can present a danger to workers in the area, as well as providing a tendency to break the felt and prevent good delamination.

After the product has been stripped from the felt web, the web may be reused in the process. This is an added advantage of utilizing a method of this invention, especially inasmuch as prior art methods frequently result in destruction of the release paper, or destruction of the felt which has not been moisturized as described.

Figure 2:
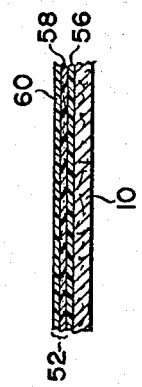
FIG. 2 is an enlarged fragmentary sectional view along lines 2—2 of FIG. 1 and viewed in the direction of the arrows.

FIG. 2 illustrates a partial cross section of the felt web 10 with the product 52 thereon. The release coat is designated 56, the foam layer 58, and the wear layer 60. The stripping occurs between the foam layer 58 and the layer of the release coat 56.

As a test of the method of this invention, a felt roll was processed as described previously with the application of the release coat of Table 1, a vinyl plastisol layer, and a vinyl wear layer. As the material left the foaming oven, moisture was applied to only three-fourths of the length of the web, while one-fourth of the web did not have moisture applied thereto. As the product was stripped from the felt backing web, very good delamination occurred between the moisturized web and the product, however, very poor delamination and breaking up of the felt web occurred at the unmoisturized portion of the carrier web. Additionally, there was no static charge build-up in the moisturized portion of the web, however, a static charge did build up in the unmoisturized portion of the web.

Clearly then, the use of the moisturizing step provides superior results over merely using a release coating without moisturizing.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What we claim is:

1. In a method for producing unsupported resinous surface coverings and the like by applying a foamable vinyl plastisol layer to a cellulose fiber felt substrate, gelling, fusing and foaming the layer by heat and then stripping the solidified foam layer from the substrate, the improvement which comprises:
   (a) providing a moisture pervious cellulosic fiber support web as the substrate,
   (b) applying an aqueous release coating of a water soluble hydroxyethyl cellulose to the support web,
   (c) depositing a foamable vinyl plastisol layer on the release coat and heating the layer to gel the layer and further heating the gelled layer to fuse and foam the layer,
   (d) impregnating the support web with moisture so as to raise the moisture content of the support web to about 4 to 10% by weight, and
   (e) stripping the foamed layer from the support web.

2. The method as in claim 1 wherein:
   (a) the support web has an initial moisture content of about 1 to about 2%.

3. The method as in claim 1 including:
   (a) reusing the stripped support web.

4. The method as in claim 1 including:
(a) impregnating the support web with moisture so that the web will have about six percent moisture content by weight.

5. The method as in claim 4 including:
(a) printing a resinous wear layer over the gelled plastisol, and
(b) heating the plastisol and resinous wear layer in order to substantially simultaneously foam the plastisol and fuse the wear layer.

6. The method as in claim 4 including:
(a) applying the release coat at a wet thickness of from about 0.004 to about 0.010 inch.

7. The method as in claim 6 wherein:
(a) the release coat has a wet thickness of about 0.0055 inch.

8. The method as in claim 4 including:
(a) applying the release coat at a rate of about 0.20 to about 0.28 pounds of wet release coat per square yard of support web.

9. An apparatus for producing unsupported resinous surface coverings and the like including:
(a) a moisture pervious fibrous support web,
(b) means for supplying said support web including web feeding means and web take-up means,
(c) means for applying a release coat to said support web,
(d) means for depositing a foamable vinyl plastisol layer over said release coat and means for heating the layer to gel the layer and further heating means downstream of the first heating means to fuse and foam the layer,
(e) impregnating means downstream of the last heating means for moisturizing said support web to a moisture content of about 4 to 10%, and
(f) means for stripping said resinous layer from said moisturized support web.

10. An apparatus as in claim 9 wherein:
(a) said support web includes a cellulosic fiber web.

11. An apparatus as in claim 10 wherein:
(a) said impregnating means includes spray means.

12. An apparatus as in claim 10 wherein:
(a) said impregnating means includes roller brush means.

13. An apparatus as in claim 10 wherein there is included:
(a) means for applying a wear layer resin over said gelled plastisol, and
(b) second heating means for simultaneously foaming said plastisol and fusing said wear layer resin.

14. An apparatus as in claim 10 wherein:
(a) said impregnating means is positioned beneath said support web.

References Cited

UNITED STATES PATENTS

| | | | |
|---|---|---|---|
| 2,913,773 | 11/1959 | Hassel | 264—126 |
| 2,356,902 | 8/1944 | Walter | 264—338 |
| 2,254,263 | 9/1941 | Bratring | 264—338 X |
| 2,866,717 | 12/1958 | Bristol | 264—338 X |
| 2,994,111 | 8/1961 | Koss et al. | 264—338 X |
| 3,157,562 | 11/1964 | Kine et al. | 161—227 X |
| 3,293,094 | 12/1966 | Nairn et al. | 264—46 X |

OTHER REFERENCES

Klug, E. D.: "Cellulose Derivatives," in Kirk-Othmer Encyclopedia of Chemical Technology, second completely revised edition, vol. 4, pp. 643–652.

"Kirk-Othmer Encyclopedia of Chemical Technology," second completely revised edition, Anthony Standen Exec. Editor, New York, Interscience, © 1964, vol. 4, pp. 646–651.

"The Condensed Chemical Dictionary," seventh edition, completely revised and enlarged by Arthur and Elizabeth Rose, New York, Reinhold, © 1966, pp. 421 and 819.

Zimmerman, O. T. and Irvin Lavine: "Handbook of Material Trade Names," 1953 edition, second printing, Dover, N.H., Industrial Research Service, 1953, p. 490.

Zimmerman, O. T. and Irvin Lavine: "Supplement II to the 1953 Edition of Handbook of Material Trade Names," Dover, N.H., Industrial Research Service, 1957, p. 94.

Zimmerman, O. T. and Irvin Lavine: "Supplement III to the 1953 Edition of Handbook of Material Trade Names," Dover, N.H., Industrial Research Service, 1960, p. 210.

Zimmerman, O. T. and Irvin Lavine: "Supplement IV to the 1953 Edition of Handbook of Material Trade Names," Dover, N.H., Industrial Research Service, 1965, pp. 117–118.

PHILIP E. ANDERSON, Primary Examiner

U.S. Cl. X.R.

161—160, 161, 406; 264—46.3, 126, 216, 307, 338, DIG. 60; 425—40, 224, DIG. 201